United States Patent
Roty et al.

(10) Patent No.: US 9,770,952 B2
(45) Date of Patent: Sep. 26, 2017

(54) NOISE-REDUCING DEVICE FOR A TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Gael Roty, Gunma (JP); Laurent Maes, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 483 days.

(21) Appl. No.: 14/362,569

(22) PCT Filed: Nov. 27, 2012

(86) PCT No.: PCT/EP2012/073669
§ 371 (c)(1),
(2) Date: Jun. 3, 2014

(87) PCT Pub. No.: WO2013/083428
PCT Pub. Date: Jun. 13, 2013

(65) Prior Publication Data
US 2014/0338805 A1    Nov. 20, 2014

(30) Foreign Application Priority Data

Dec. 5, 2011 (FR) ...................................... 11 61164

(51) Int. Cl.
*B60C 11/13* (2006.01)
*B60C 19/00* (2006.01)

(52) U.S. Cl.
CPC ............ *B60C 19/002* (2013.01); *B60C 11/13* (2013.01); *B60C 11/1307* (2013.01); *B60C 11/1353* (2013.01); *B60C 2011/1361* (2013.01)

(58) Field of Classification Search
CPC ... B60C 11/1369; B60C 11/13; B60C 11/042; B60C 11/047; B60C 2011/1338;
(Continued)

(56) References Cited

FOREIGN PATENT DOCUMENTS

| DE | 4403662 | * | 8/1995 |
|----|---------|---|--------|
| EP | 1946943 A | | 7/2008 |

(Continued)

OTHER PUBLICATIONS

English machine translation of DE4403662, dated Aug. 1995.*
(Continued)

*Primary Examiner* — Robert Dye
(74) *Attorney, Agent, or Firm* — Dickinson Wright PLLC

(57) ABSTRACT

Tread having a tread surface intended to come into contact with a road surface and comprising at least one groove of width W and of depth P delimited by two walls facing one another, these walls being joined together by a groove bottom, at least one groove comprising at least one closure device for at least partially closing this groove as it passes through the contact patch, each closure device comprising at least one flexible blade of suitable thickness that allows it to flex under the effect of a circulation of liquid, this at least one flexible blade projecting from the bottom of the groove, each flexible blade being delimited by a contact wall intended to come into contact with the road surface and by end walls each facing a wall delimiting the groove and lateral walls, this tread further comprising at least one passage between the bottom of the groove and each blade of the device, this passage being intended to ensure a minimal flow of water when driving on a water-covered road surface.

8 Claims, 2 Drawing Sheets

(58) Field of Classification Search
CPC ....... B60C 2011/133; B60C 2011/1361; B60C 11/1353
See application file for complete search history.

(56) References Cited

FOREIGN PATENT DOCUMENTS

| JP | 60116510 A | | 6/1985 |
|---|---|---|---|
| JP | 60121103 A | | 6/1985 |
| JP | 3276802 A | | 12/1991 |
| JP | 4221207 A | | 8/1992 |
| JP | 5155203 A | | 6/1993 |
| JP | 8150812 A | | 6/1996 |
| JP | 2003-165310 | * | 6/2003 |
| JP | 2006-088585 | * | 4/2006 |
| JP | 2006-341655 | * | 12/2006 |

OTHER PUBLICATIONS

English machine translation of JP2006-088585, dated Apr. 2006.*
PCT/EP2012/073669, International Search Report (ISR), Form PCT/ISA/210, dated Feb. 28, 2013 (including English translation), 8 pgs.

* cited by examiner

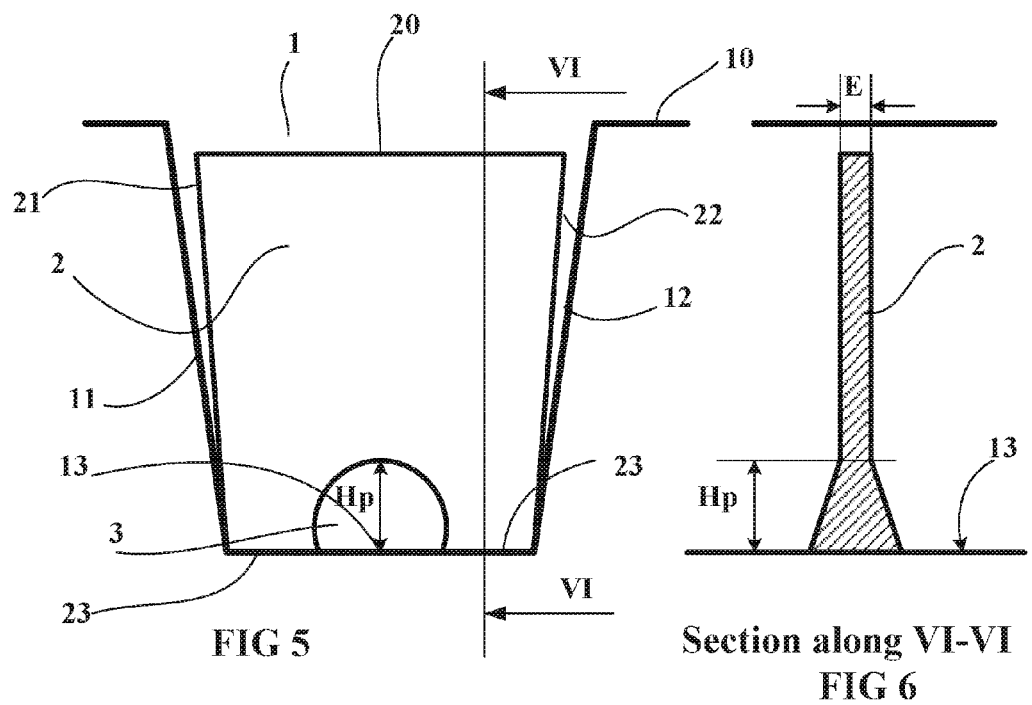
FIG 5
Section along VI-VI
FIG 6
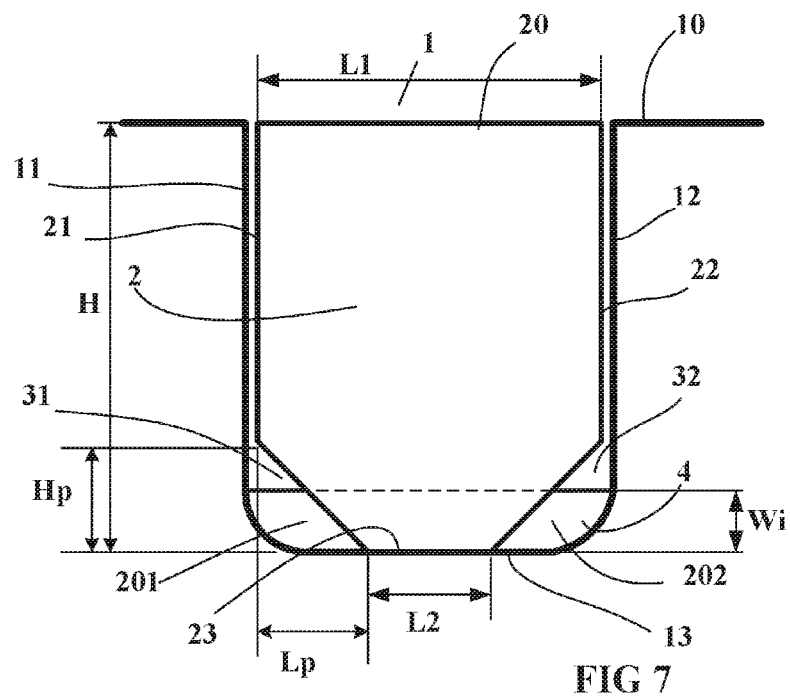
FIG 7

NOISE-REDUCING DEVICE FOR A TIRE

This application is a 371 national phase entry of PCT/EP2010/073669, filed 27 Nov. 2012, which claims benefit of FR 1161164, filed 5 Dec. 2011, the entire contents of which are incorporated herein by reference for all purposes.

BACKGROUND

Field

The present disclosure relates to tire treads and more particularly to treads comprising grooves comprising flexible devices that form devices that reduce the noise generated by air going into resonance inside these grooves during driving.

Description of Related Art

It is known that as a tire that is running comes into contact with a road surface air is made to circulate in a sort of pipe formed by part of a groove, notably, although not exclusively, a groove of circumferential overall orientation, and the road surface itself, this pipe being open at both ends.

In this pipe there is formed, in the contact patch, a column of air which goes into vibration and the resonant frequency of which depends on the length between the two ends of the pipe and, therefore, on the length of groove in contact with the road surface.

This resonance of the air in the grooves has the result of generating, in a vehicle fitted with these tires, a noise that can be heard inside the vehicle and outside the vehicle.

These inside and outside noises usually correspond to a frequency of 1 kHz or thereabouts, which is a frequency to which the human ear is particularly sensitive. In order to reduce such resonant noise, it is known practice to arrange, in each circumferentially oriented or generally circumferentially oriented groove, a plurality of relatively thin closure membranes or blades made of a rubbery material, each closure membrane or blade occupying the entire cross section of the groove or, at least, a large proportion of this cross section. Each closure membrane may extend from the bottom of the groove or may be fixed to at least one of the walls delimiting the said groove.

Thanks to these flexible closure membranes, the length of the column of air in each circumferential groove is reduced by comparison with the total length of the groove in the contact patch, and this leads to a change in the resonant frequency. This change in frequency is towards resonant frequency values to which the human ear is less sensitive. The number of flexible membranes to form a running-noise-reducing device needs to be determined so that the length of groove that can go into resonance in contact with the road surface are suited to delivering resonances that are less perceptible to the ear.

What is meant by relatively thin is that each flexible closure blade or membrane is able to flex only under suitable conditions achieved when running on a water-covered road surface, notably in rainy weather. Specifically, in order to maintain a function of draining away water between the road surface and the tire, it is necessary for this membrane to flex under the action of the water pressure in order to open the cross section of the groove to the flow of the water.

Several solutions of this type for reducing the resonance of the column of air vibrating in the grooves have been proposed, for example in patent document FR2715891.

In the case of noise-reducing devices formed of at least one flexible blade, each flexible blade being connected to the bottom of a groove, the device is seen to be highly effective in the new condition. However, this effectiveness diminishes after the tread comprising grooves having such devices becomes partially worn. One reason for this is the increase in flexural rigidity of each blade when it has become partially worn.

It is an object of embodiments of the invention to improve the effectiveness of such noise-reducing devices with tread wear.

Definitions:

The tread surface of a tread corresponds to the surface of the tread that comes into contact with the ground when a tire fitted with such a tread is being driven on.

A groove corresponds to a space formed in a tread, this space being delimited by walls of material of raised elements (blocks, ribs), these walls being joined together by a groove bottom distant from the tread surface by a maximum distance equal to the depth of the groove. The groove bottom corresponds to that part of the groove that is situated radially on the inside of a legal tread wear limit beyond which the tread no longer meets the legal requirements for use. In general, a plurality of tire tread wear limit indicators are positioned in one or more grooves. The radially external part of these indicators corresponds to the transition between the walls of a groove and the bottom of the said groove.

A block is a raised element formed on a tread, this element being delimited by voids or grooves and comprising lateral walls and a contact face, the latter—which is intended to come into contact with the road surface during driving—forming part of the tread surface of the tread.

A rib is a raised element formed on a tread, this element being delimited by two grooves. A rib comprises two lateral walls and a contact face, the latter being intended to come into contact with the road surface.

A radial direction means a direction perpendicular to the axis of rotation of the tire (this direction corresponds to the direction of the thickness of the tread).

An axial direction means a direction parallel to the axis of rotation of the tire.

A circumferential direction means a direction which is tangential to any circle centred on the axis of rotation. This direction is perpendicular both to the axial direction and to a radial direction.

SUMMARY

The present invention, in a particular embodiment, seeks to obtain a device that reduces the resonant noise of the grooves of a tread, this device comprising at least one flexible blade fixed to the bottom of a groove and which maintains its effectiveness at reducing resonant noise and at draining liquid throughout the wearing away of the tread provided with such a device and notably after at least 50% of the depth of the grooves has worn away.

It should be noted that implementation of this device may be of advantage to any type of groove, whether this groove is oriented circumferentially, transversely or obliquely.

To this end, the subject of an embodiment of the invention is a tread for a tire, this tread having a tread surface intended to come into contact with a road surface and comprising at least one groove of width W and of depth P delimited by two walls facing one another, these walls being joined together by a groove bottom, this groove bottom corresponding to that part of the groove that connects the walls and is situated radially below the legal tread wear limit, at least one groove comprising at least one closure device for at least partially closing the cross section of this groove as it passes through the contact patch, each closure device comprising at least one blade of suitable thickness that allows it to flex under the effect of a circulation of water when driving on a water-covered road surface, this at least one flexible blade being fixed to the bottom of the groove, each flexible blade of mean thickness E being delimited by a contact wall intended to come into contact with the road surface during driving, and by end walls each facing a wall delimiting the groove and lateral walls spaced apart by a distance equal to the mean thickness E of the blade.

This tread is characterized in that at least one passage is formed between the bottom of the groove and each blade of the closure device, this passage being intended to ensure a determined flow of water in the groove when driving on a water-covered road surface, this determined flow taking place without the need for each blade to flex, and to do so irrespective of the level of tread wear.

In the context of this invention, the term "passage" is understood as meaning a space bounded in part by the bottom of the groove and in part by a wall of the flexible blade.

If the length of the contact wall of a flexible blade in the new condition is denoted L1 and the connection length of this same blade with the bottom of the groove is denoted L2, then a length Lp of the passage formed between this blade and the bottom of the groove is defined as being equal to the difference (L1−L2). This length Lp of the passage is at least equal to 30% of L1 and at most equal to 70% of L1. For preference, the maximum height Hp of the passage is at least equal to the height of the legal tread wear limit.

The passage formed on each flexible blade may adopt any geometry. The part of the flexible blade limiting this passage may follow a rectilinear or circular profile or any other suitable geometry. The connection between this part of the flexible blade and the bottom of the groove may be configured in such a way as to limit the concentrations of stresses by notably providing the parts with suitable radii of curvature.

In an alternative form of the invention, the closure device is formed of a single flexible blade closing practically the entire cross section of a groove and comprising at least one passage between itself and the bottom of the groove.

In an alternative form, this single blade comprises a passage on each side of its length L2 of connection with the bottom of the groove.

In another alternative form of the invention, the closure device is formed by at least two flexible blades, these flexible blades being positioned either end to end so that they touch via one of their end walls or offset from one another in the main direction of the groove (this direction corresponding to the direction of a flow of liquid in the groove).

In this alternative form, each flexible blade comprises a passage and these two passages may complement one another to form a single orifice passing through the noise-reducing device formed of two flexible blades.

Each passage has a height at least equal to the height of the tread wear indicator.

The total surface area of the opening formed by the passages is at most equal to 30% of the surface area of the cross section, in the new condition, of the groove in which the closure device is formed. This same total surface area of the opening is at least equal to 30% of the surface area of the cross section of the groove when this groove is limited to a height of 1.6 mm which corresponds to the legal limit of tread wear for passenger car tires at the date of the invention.

By virtue of embodiments of the invention, the flexural rigidity of each blade, even though it increases gradually with wear because it height decreases, nonetheless remains suitable for allowing the minimal flow of liquid when driving in rainy weather, and does so irrespective of the level of tread wear.

It should be noted that after wear representing more than 50% of the height of the tread, the problem of noise associated with resonance in the grooves is appreciably lessened and therefore no longer requires any noise-reducing device.

In order to take account of the reduction in surface area for connection of each blade with the groove bottom, this reduction being a consequence of there being at least one passage between this blade and the bottom of the groove, it is advantageous to increase this cross-sectional area at least locally in order to make the moulding of the said blade easier. This localized increase in surface area also reinforces the connection between each blade and the bottom of the groove in which the said blade is moulded, and this is beneficial from the standpoint of the ability of the blades to withstand the bending cycles.

Other features and advantages of embodiments of the invention will emerge from the description given hereinafter with reference to the attached drawings which, by way of nonlimiting examples, show alternative forms of embodiment of the subject matter of the invention.

BRIEF DESCRIPTION OF THE FIGURES

FIG. 5 shows an alternative form whereby the surface area of the cross section of a blade is constant over its entire height;

FIG. 6 shows a view in section on VI-VI of FIG. 5;

FIG. 7 shows another alternative form of a closure device comprising a single blade according to the invention.

DETAILED DESCRIPTION OF SPECIFIC EMBODIMENTS

In the figures accompanying this description, like reference signs may be used to describe alternative forms of the invention when these reference signs refer to elements of the same kind, whether this kind is structural or even functional.

Figure 1:
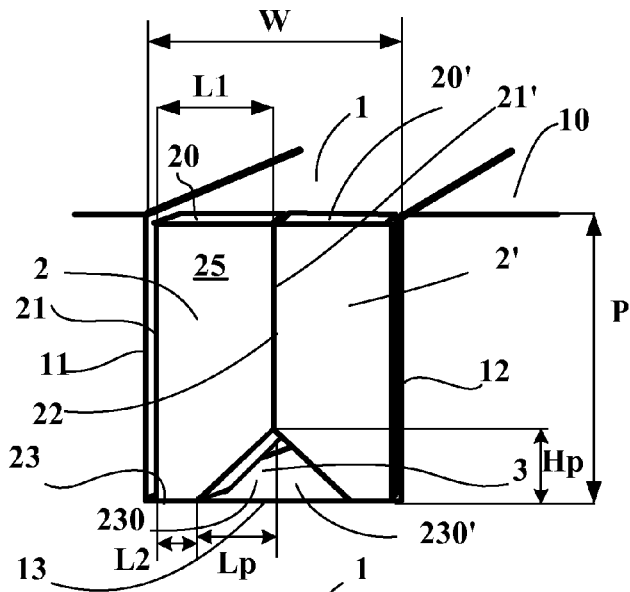
FIG. 1 shows one alternative form of a closure device comprising two flexible blades according to the invention, these blades being arranged facing one another.

FIG. 1 shows an alternative form of a closure device comprising two flexible blades according to the invention, these blades being positioned facing one another.

FIG. 1 shows, in cross section, a partial view of a groove of a tread according to the invention with which a tire of size 225/55 R 17 is equipped. This FIG. 1 depicts a groove 1 bounded by two raised elements of the tread, this groove 1 extending substantially in a circumferential direction of the tire on which said tread is fitted. This groove 1, of width W—measured on the tread surface 10 in the new condition, equal to 13 mm and of depth P equal to 7.5 mm, is bounded by a first lateral wall 11 and a second lateral wall 12, these lateral walls facing one another, and a groove bottom 13 connecting these lateral walls together. The tread comprises a tread surface 10 intended to come into contact with a road surface during driving. In what follows, the bottom of the groove 13 corresponds to that part of the groove 1 that remains after the tread has been worn down to the legal limit set by the national regulations and generally indicated by tread wear limit indicators.

This groove 1 comprises a noise-reducing device formed by a plurality of flexible obstacles moulded into the said groove. Each obstacle comprises two blades 2, 2' each occupying half the cross section of the groove 1, these blades 2, 2' being in the extension of one another so that each has an end wall in contact with an end wall of the other blade. Each blade 2, 2' projects from the bottom 13 of the groove 1.

Each flexible blade 2, 2' has a suitable thickness (in this particular instance equal to 0.6 mm) that allows it to flex easily about an axis more or less along the connection between each blade 2, 2' and the bottom 13 of the groove with a view to allowing water to flow along the groove 1 when driving in rainy weather while at the same time acting as an obstacle to the circulation of air when driving on a dry road surface (under the conditions of driving on a dry road surface, the air pressure is not high enough to cause these blades to flex).

The first blade 2 is delimited by two end walls 21, 22 one facing the wall 11 delimiting the groove 1 and the other facing an end wall 21' of the second flexible blade 2' and a contact wall 20 intended to come into contact with the road surface and lateral walls 25, 26 (visible in FIG. 2) spaced apart by a distance equal to the thickness E of the blade 2. This first blade 2 is connected to the bottom 13 of the groove by a wall 23. Formed between the first blade 2 and the bottom 13 of the groove is a passage 230 of triangular shape of maximum height Hp substantially equal to the tire tread wear limit.

Each blade 2, 2' has a width L1 equal to 6 mm, this width L1 being measured in the direction of the width W of the groove 1 on the contact wall of the blade in the new condition (i.e. before it has done any running). The length of connection of the blade 2 with the groove bottom is denoted L2; this length L2 is in this particular instance equal to approximately 50% of the length L1.

Formed in combination with this first blade 2 is a second blade 2' of the same geometry, this second blade being likewise connected to the bottom of the groove by a length equal to the length L2. This blade likewise has a contact wall 20' which, like the contact wall 20 of the first blade, is offset slightly with respect to the tread surface 10 of the tread in the new condition. Between this second blade 2' and the bottom of the groove another triangular passage 230' is formed.

In the scenario depicted, the first blade 2 and the second blade 2' are formed in such a way that each has an end part 22, 21' which are positioned facing one another after the tread has been moulded and so that they are in contact or almost in contact.

In this alternative form, the combination of the two blades 2, 2' forms an orifice 3 the cross-sectional area of which is substantially equal to the sum of the cross-sectional areas of each passage 230, 230'.

Figure 2:
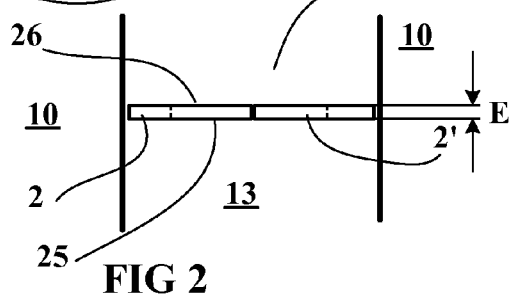
FIG. 2 shows a plan view of the alternative form of device shown in FIG. 1.

In FIG. 2, which is a plan view of part of the groove 1 of FIG. 1, shows that the two blades 2, 2' of the same thickness E are positioned end to end so that they almost completely close the width W of the groove. Only suitable clearances are maintained between the flexible blades and the walls delimiting the groove.

Figure 3:
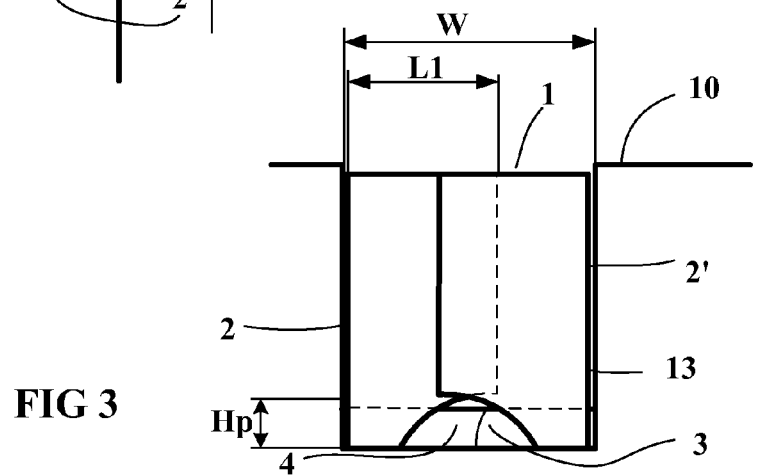
FIG. 3 shows another alternative form of a closure device comprising two flexible blades according to the invention, these blades being offset from one another.

FIG. 3 shows another alternative form of closure device according to the invention, this device comprising two flexible blades 2, 2', these blades being offset from one another in the main direction of the groove 1; they are also set back slightly from the tread surface 10 in the new condition. The main direction of the groove corresponding to the direction of the largest dimension of the said groove along which water flows when driving on a water-covered road surface. A tread wear indicator 4 has been depicted as a protrusion moulded into the bottom 13 of the groove. It may be seen that the height Hp of the orifice 3 formed is greater than the height of the tread wear indicator 4.

Each blade is similar to the blades of the device described with the support of FIG. 1, the only differences lying in the layout of the said blades with respect to one another and in the length L1 of each blade. Indeed each blade has a length L1 of its contact wall in the new condition which is greater than half the width W of the groove. In this alternative form, the orifice 3 formed is bounded by walls of curvilinear contour.

Figure 4:
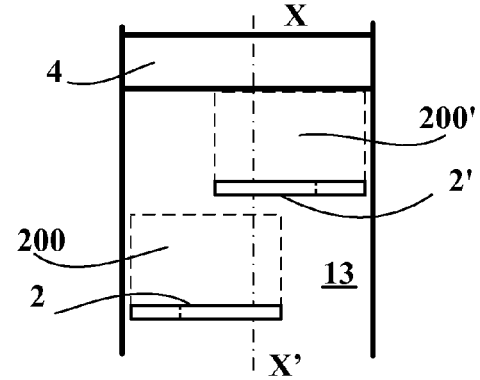
FIG. 4 shows a plan view of the alternative form of device shown in FIG. 3.

In FIG. 4, which shows a plan view of part of this groove 1 shown in FIG. 3, it is possible to see the two blades 2 and 2' offset from one another in the main direction XX' of the groove. The tread wear indicator 4 formed by moulding in the bottom 13 of the groove in order to indicate the tread wear limit to the user can be made out. As shown here, the maximum height of the orifice 3 is designed to be greater than the height of the indicator 4 measured from the bottom 13 of the groove. Thus, even as tread wear approaches the limit the blades are also worn and therefore have flexural rigidities which are greater than they were in the new condition. The presence of an orifice 3 having a maximum height Hp greater than the height of the tread wear indicator 4 is one way of allowing liquid to flow in the groove even when the blades do not flex as readily. This same FIG. 4 shows the position adopted by each of the blades 2 and 2' after flexing when water is flowing in the groove (lines drawn in dotted line referenced 200 and 200').

FIG. 5 shows an alternative form whereby the cross section of a groove 1 is closed by a noise-reducing device comprising a single blade 2. The groove is delimited by lateral walls 11, 12 themselves connected by a bottom 13. The lateral walls make between them a small but non-zero angle. The blade 2 has a contact wall 20 and end walls 21, 22 that more or less follow the lateral walls leaving enough of a clearance to allow the blade to flex under the action of a hydraulic pressure when driving on a water-covered road surface. This blade 2 set back slightly from the tread surface 10 in the initial condition is connected to the bottom 13 by a connecting wall 23 comprising two disjointed parts separated from one another by a passage 3 of semicircular shape.

Furthermore, and as may be seen in FIG. 6 which is a section on VI-VI of FIG. 5, the blade 2 has a constant thickness only between the contact wall in the initial condition and a level corresponding to the maximum height Hp of the passage 3 formed with the bottom of the groove. Specifically, the surface area of the cross section of the blade 2 is constant over its entire height and in order to achieve this result it is necessary to vary the thickness of the blade in the part delimiting the passage 3 so that the surface area of the cross section of the blade measured at the bottom 13 of the groove is equal to any other surface area of cross section taken at any other level along this blade. In this way, an increase in thickness is generated at the connection with the bottom 13 of the groove, this thickness then decreasing gradually up to the maximum height Hp of the passage formed between the blade and the bottom 13.

Advantageously, the increase in thickness is suited to the surface area of the cross section of the blade being constant or near-constant whatever the level considered along the height of the blade. By virtue of this feature, it is thus easier satisfactorily to fill the cavities of a mould used for moulding this type of blade with the rubbery compound that makes up the tread.

In the alternative form according to the invention shown in FIG. 7, a closure device comprises a single blade with two orifices created 31, 32.

The device for reducing resonant noise in the groove 1 is formed of a single blade 2 transversely closing the cross section of this groove 1. This blade comprises a contact wall 20 of length L1 in the new condition, this contact wall 20 being intended to come into contact with the road surface and two end walls 21, 22 facing the two walls 11, 12 delimiting the groove 1. This blade 2 is connected to the bottom 13 of the groove by a wall 23 having a length L2. On each side of this connection between the flexible blade 2 and the bottom 13 of the groove are formed two passages 201, 202 of the same dimensions. Each passage has a length Lp representing 25% of the maximum length L1 of the blade and a height Hp equal to 20% of the height H of the flexible blade measured in the new condition. In this particular instance, the height Hp of each passage 201, 202 is slightly greater than the height Wi of the tread wear limit indicator 4.

In the scenario depicted, the total surface area of the opening formed by the passages 201, 202 is equal to 20% of the total area of the cross section in the new condition of the groove in which the closure device is formed. This same total surface area of the opening is equal here to 50% of the surface area of the cross section of the groove limited to a height Wi equal to 1.6 mm and corresponding to the height of the tread wear limit.

As the invention has been described in general terms and by means of a number of alternative forms, it must be appreciated that this invention is not restricted solely to these alternative forms described and depicted. The various alternative forms described here can be combined with one another by a person skilled in the art to suit the pursued objective, notably by using in one and the same tire the various devices described.

It is clear that various modifications can be made without departing from the overall scope of the present invention. In particular, all the alternative forms described here—with the exception of the alternative form of FIG. 7—show blades the contact wall of which is offset slightly towards the inside with respect to the tread surface in the new condition, but it is entirely possible to provide them at the same level or even offset slightly towards the outside of the same tread surface. The noise-reducing devices according to the invention can be used in grooves oriented circumferentially or obliquely, i.e. those that make a non-zero angle with the circumferential overall direction.

The invention claimed is:

1. A tread for a tire, this tread comprising a tread surface adapted to come into contact with a road surface, and comprising:
    at least one groove of width W and of depth P delimited by two walls facing one another, these walls being joined together by a groove bottom, this groove bottom corresponding to that part of the groove that connects the walls and is situated radially below an outermost of a tread wear indicator,
    wherein at least one groove comprises:
        at least one closure device adapted to at least partially close this groove as it passes through a ground contact patch,
        wherein each closure device comprises at least one flexible blade of suitable thickness that allows it to flex under the effect of a circulation of liquid, this at least one blade being fixed only to the bottom of the groove,
        wherein each flexible blade of a thickness E is delimited by a contact wall adapted to come into contact with the road surface and by end walls each facing a wall delimiting the groove and lateral walls spaced apart by a distance equal to the thickness E of the blade,
        at least one passage formed between the bottom of the groove and each blade of the device, this passage being adapted to ensure a minimal flow of water when driving on a water-covered road surface, and to do so irrespective of the level of tread wear.

2. The tread according to claim 1, wherein the at least one passage formed between the bottom of the groove and a flexible blade of the at least one closure device has a length Lp measured in the direction of the width of the cross section of the groove, this length Lp being at least equal to 30% and at most equal to 70% of a length LI of the contact wall of the blade when the tread is in a new condition.

3. The tread according to claim 1, wherein each closure device comprises a single blade provided with a passage on either side of its length for connecting with the bottom of the groove.

4. The tread according to claim 1, wherein the at least one closure device is formed by at least two flexible blades, these flexible blades being positioned end to end so that they touch via one of their end walls.

5. The tread according to claim 4, wherein the at least one closure device is formed by two flexible blades, wherein each flexible blade comprises a passage, these two passages complementing one another to form an orifice that allows water to flow when driving over a water-covered road surface.

6. The tread according to claim 5, wherein the orifice formed by the passages has a total cross-sectional area that is at most equal to 30% of a total cross-sectional area of the cross section, when the tread is in a new condition, of the groove in which the closure device is formed.

7. The tread according to claim 1, wherein the at least one closure device is formed by at least two flexible blades, these flexible blades being positioned offset from one another in the main direction of the groove, this direction corresponding to the direction in which the liquid flows in the groove.

8. A tread for a tire, this tread comprising a tread surface adapted to come into contact with a road surface, and comprising:
    at least one groove of width W and of depth P delimited by two walls facing one another, these walls being joined together by a groove bottom, this groove bottom corresponding to that part of the groove that connects the walls and is situated radially below an outermost of a tread wear indicator,
    wherein at least one groove comprises:
        at least one closure device adapted to at least partially close this groove as it passes through a ground contact patch,
        wherein each closure device comprises at least one flexible blade of suitable thickness that allows it to flex under the effect of a circulation of liquid, this at least one blade being fixed only to the bottom of the groove,
        wherein each flexible blade of a thickness E is delimited by a contact wall adapted to come into contact with the road surface and by end walls each facing a wall delimiting the groove and lateral walls spaced apart by a distance equal to the thickness E of the blade, at least one passage formed between the bottom of the groove and each blade of the device, this passage being adapted to ensure a minimal flow of water when driving on a water-covered road surface, and to do so irrespective of the level of tread wear, and wherein the thickness of each blade is chosen such that a cross-sectional area of the blade parallel to the contact wall is maintained constant over the entire height of the blade.

\* \* \* \* \*